Dec. 18, 1956 N. KARPF 2,774,288

LENS STANDARD

Filed April 11, 1952

INVENTOR:
NIKOLAUS KARPF

United States Patent Office 2,774,288
Patented Dec. 18, 1956

2,774,288
LENS STANDARD

Nikolaus Karpf, Munich, Germany, assignor to Valentin Linhof, Munich, Germany, a German company Application April 11, 1952, Serial No. 281,817

Claims priority, application Germany April 13, 1951

1 Claim. (Cl. 95—50)

This invention relates to improvements in adjustment means for lens standards.

The requirements of high-quality photographic cameras necessitate tilting of the lens standard relative to the extension track. Some standards require to be adjusted to a certain angle in compliance with an equally large extent of tilting the extension track, as for instance when wide-angle lenses are used.

Tiltable lens standards known to date are not constructed rigidly enough. The dependability of the camera on such tiltable standards for assuming an inclined position, is therefore insufficient.

It is therefore one of the objects of the invention to provide means affording simplified construction and easy and convenient manipulation of adjusting means centrally disposed of the carriage of a camera, to regulate the angular relationship of the lens standard relative to said carriage and the track on which the latter is supported.

It is another object of the invention to provide means ensuring immediate and positive response of angular movements of the lens standard to turning movements of a single adjustment knob supported by the carriage of a camera.

Yet a further object of the invention is to provide means facilitating guidance of a portion of the lens standard to a limiting position relative to a socket, in which said knob is retained.

Still another object of the invention resides in the provision of means for displacing said knob in its socket against the action of a spring connected to said hinge portion of said lens standard.

The above and other objects and features will become apparent from the following detailed description, reference being made to the drawing, in which.

Figure 1:
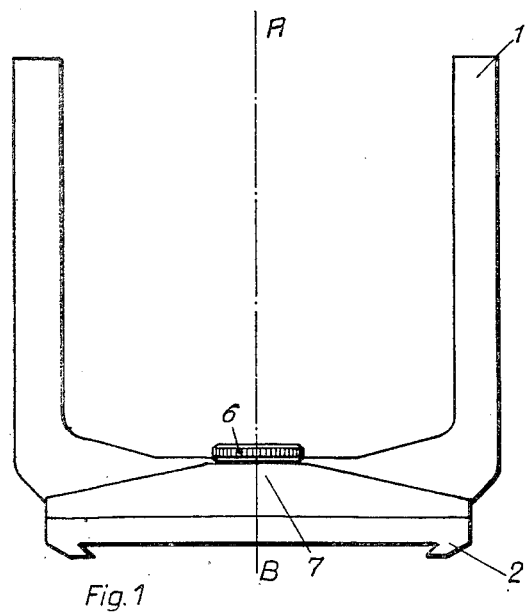
Fig. 1 is a front elevational view of a U-shaped lens standard incorporating the invention and mounted on a camera carriage.

Referring now more particularly to the drawing, there is disclosed a U-shaped standard 1 mounted on the carriage 2. The connection with the carriage is ensured by the hinge 3 (Fig. 3), the axis of which forms the single tilting axis for the standard. Carriage 2 is adapted to slide along a track on the camera base (not shown).

Figure 3:
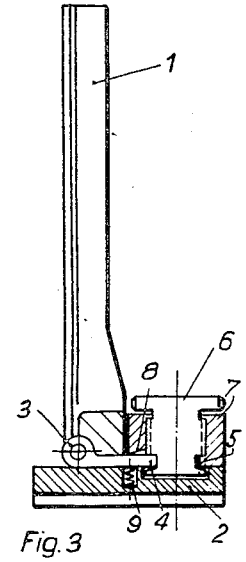
Fig. 3 is a sectional view taken along lines A—B of Fig. 1 and showing said lens standard in normal position.
Figure 2:
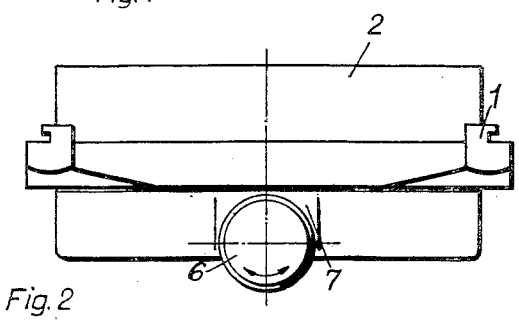
Fig. 2 is a top plan view of Fig. 1.
Figure 4:
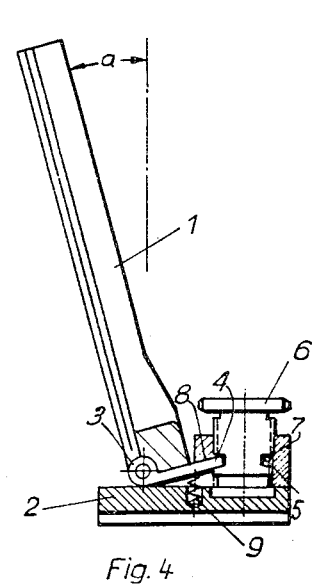
Fig. 4 is a sectional view similar to that of Fig. 3, with said lens standard in an inclined position.

Figs. 1 to 3 show the standard 1 in its normal position, whereby the hinge member 4 extends parallel to carriage 2, and into a peripheral groove 5 of the central knob 6, which is retained and can be displaced in the threaded socket 7 in a manner quite apparent from Figs. 3 and 4. Knob 6 and socket 7 are provided with interengaging means (such as threads) to ensure axial movement of said knob upon rotation of the latter.

By turning knob 6 in a direction out of the socket 7 (Fig. 4) the angular displacement of the standard 1 is ensured. Member 4 automatically follows groove 5 to thereby tilt the lens standard 1 about hinge 3 to different desired positions. If the knob 6 is rotated so far out of the socket 7 that the member 4 engages an inclined end stop 8 of a slot extending through the wall of socket 7 and in the direction of axial movement of said knob, a predetermined angle "a" is reached, which, can be used to compensate for a corresponding tilting movement of the extension track (not shown). In intermediate positions of hinge member 4 elastic means, as for instance a coil spring 9, is located to bias said member in one direction and affords secure position of the standard. The aforesaid spring 9 takes up any backlash which may be present between member 4 and groove 5 of knob 6, so as to ensure that in any intermediate angular position between the extreme positions shown in Figs. 3 and 4, the lens standard will always be held steady. Spring 9 is retained in a recess of the carriage 2, whereas hinge member 4 rests on the carriage when member 4 is in normal position. It is to be noted that said member and said stop when engaged with each other also ensure retention of said knob in said socket.

Various changes and modifications may be made without departing from the spirit and scope of the present invention and it is intended that such obvious changes and modifications be embraced by the annexed claim.

Having thus described the invention, what is claimed as new and desired to be secured by Letters Patent, is:

Adjustment means for a lens standard of a camera having a carriage; comprising a socket mounted centrally of said carriage, a knob provided with a peripheral groove and rotatably engaging said socket, interengaging means on said knob and said socket to move said knob axially upon rotation of said knob, said socket being provided with a slot extending in the direction of axial movement of said knob, and a member including a hinge connection to said standard and extending from the latter through said slot into said groove, said hinge connection being located below said lens standard and forming the tilting axis thereof, whereby rotative movement of said knob is translated into tilting movement of said standard about said tilting axis, said slot being defined by an inclined wall forming a stop against which said member abuts in predetermined position of said knob groove relative to said socket, said member and said stop when engaged with each other ensuring retention of said knob in said socket, and resilient means coacting with said carriage and said member to bias said member in one direction.

References Cited in the file of this patent

UNITED STATES PATENTS 42,971   Stock ------------------ May 31, 1864

FOREIGN PATENTS 351,120   France ---------------- Apr. 29, 1905
514,627   Germany --------------- Dec. 15, 1930